No. 663,904. Patented Dec. 18, 1900.
P. KLEBER.
PROCESS OF PRODUCING ARTIFICIAL BUILDING STONES, BRICKS, &c.
(Application filed July 15, 1899.)
(No Model.)
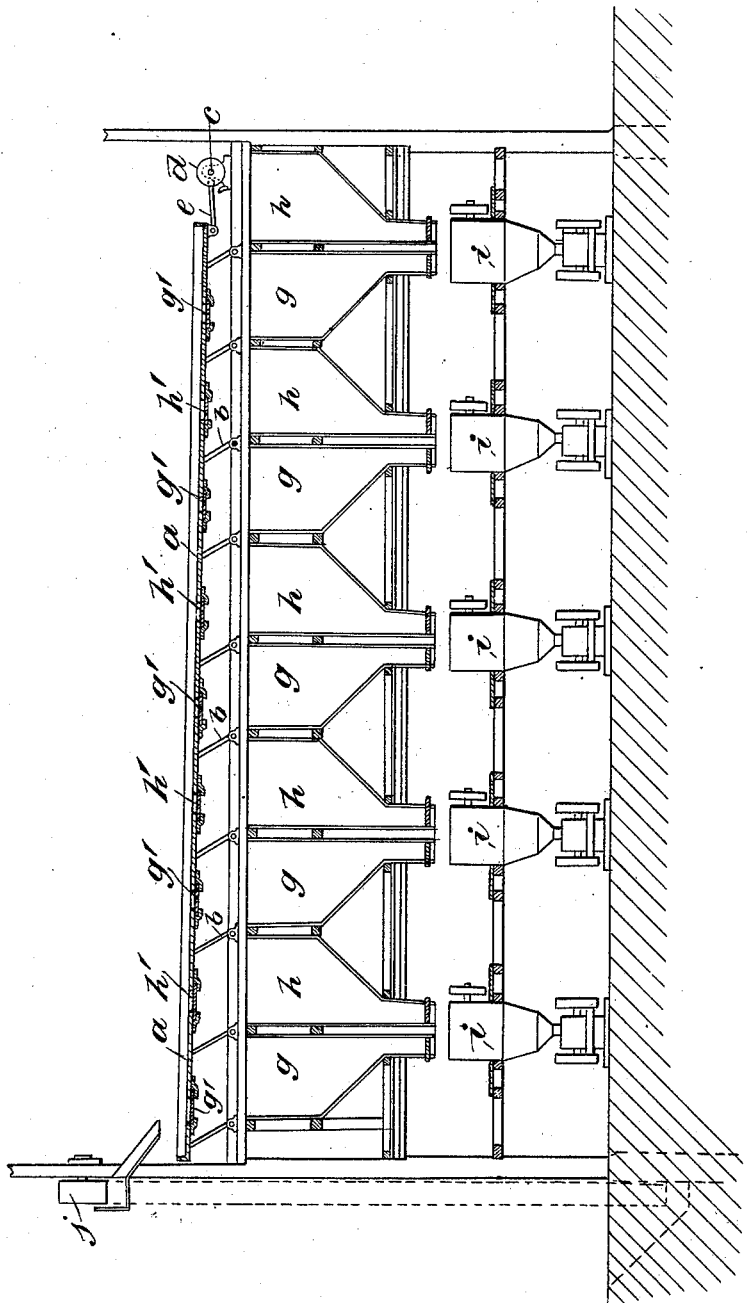
WITNESSES:
Ella L. Giles.
INVENTOR
Peter Kleber
BY Richards Co
ATTORNEYS

UNITED STATES PATENT OFFICE.

PETER KLEBER, OF MALATATT-BURBACH, GERMANY.

PROCESS OF PRODUCING ARTIFICIAL BUILDING STONES, BRICKS, &c.

SPECIFICATION forming part of Letters Patent No. 663,904, dated December 18, 1900.

Application filed July 15, 1899. Serial No. 723,924. (No specimens.)

*To all whom it may concern:*

Be it known that I, PETER KLEBER, manufacturer, a subject of the Emperor of Germany, residing at 64 Trierer-Allesstrasse, Malatatt-Burbach, Rhine Province, in the Kingdom of Prussia, Germany, have invented a certain new and useful Process for the Production of Artificial Building Stones, Bricks, and Like Articles, (for which I have filed application for patent in Great Britain, No. 1,573, dated January 23, 1899,) of which the following is a specification.

This invention relates to an improved process for the manufacture of artificial building stones and brick from a mixture of sand and lime by which artificial stone or bricks are more quickly produced of a better quality, at a lower cost, and by less costly means than the processes hitherto employed in rendering mixtures of sand and lime into artificial stone or bricks.

The objects of the improved process are to avoid the use of an excessive quantity of water beyond the amount required for the complete hydration of the lime used, so as to render unnecessary the preliminary drying operation otherwise requisite; to economize fuel in the subsequent hardening process; to obtain a mixture which can be conveniently handled in the process of molding it by mechanical pressure and which will set to some extent before it is finally hardened or indurated by the action of high-pressure steam, and to wholly avoid the use of the expensive and troublesome molds frequently used in other such processes within the steam-chambers in which the induration or hardening is effected. These objects are attained in the manner hereinafter described.

In carrying the invention into effect one part of ground burned lime is mixed with from eight to fifteen parts, by weight, of moist sand, the quantity of moisture present in the sand preferably being that which it normally contains in its natural condition. The lime and sand are uniformly incorporated with each other by being intimately and thoroughly mixed within a mixing-machine of any ordinary construction. During the operation of mixing a portion of the lime is hydrated or slaked, accompanied by a considerable rise of temperature of the mass, and thus the whole of the moisture originally present in the sand combines with a portion of the lime, so that when the operation of mixing (which should, preferably, be continued until the whole of such moisture has combined with the lime) is completed the resulting mixture is in a dry pulverulent form, having a volume about twenty per cent. greater than its original volume. By this means a mixture of even and uniform composition is obtained with the expenditure of a minimum amount of power. The mixture is then discharged from the first mixing-machine into the inlet-hopper of a second mixing-machine. With some descriptions of lime it is found to be advantageous to allow the mixture to remain at rest in the hopper of the second mixing-machine before treating it further with the object of insuring that the whole of the moisture originally present in the sand shall enter into chemical combination with that portion of the lime which it is chemically equivalent to hydrating.

The treatment in the second mixing-machine consists in adding to the dry pulverulent mixture by means of a sprinkler or other appropriate device for evenly distributing water in jets or sprays such a further quantity of water, and no more, as will suffice to slake or hydrate the remainder of the lime which was not slaked or hydrated in the first stage of the process. The mixing is continued until the whole of the water added is uniformly and evenly distributed throughout the mass. A considerable rise in temperature, due to the hydration of the further quantity of lime, results, and if the operation is properly conducted and an excess of water beyond that chemically necessary for the hydration of the whole of the lime has not been added the resulting mixture is of a dry and pulverulent form. It is highly important that an excess of water should not be used at this stage of the process; otherwise a sloppy mass will be produced of uneven composition and the hydration of the lime will not be so rapid as when an excess of water is absent. Moreover, the mixture is effected with a less expenditure of power than would be requisite in the case of the plastic mass which would be the result of adding an excess of water and a more thorough and intimate mixture, and consequently more complete hydration of the lime is obtained in a shorter time than would otherwise be the case. When the hydration of practically the whole of the lime has been effected, a small additional quantity of water or of milk of lime may be added in order to temper the whole into a more or less plastic mass and render it into such a condition that it will cohere with a considerable degree of firmness when submitted to mechanical pressure in the molds of the presses subsequently employed. The quantity of water or of milk of lime necessary for this operation will depend very considerably upon the state of fineness of division of the sand and lime employed and more or less upon the other physical characteristics of these materials. The object, however, to be fulfilled is the production by means of a minimum quantity of water of a more or less plastic mass which will firmly cohere when submitted to pressure in mechanical molding-presses and which will to a certain extent set or harden after pressure and before it is hardened by the subsequent process of steaming. Great care must, however, be exercised to add no more water than is absolutely necessary for this purpose, as any excess so added will have to be eventually evaporated out of the mass in the steaming-chambers, and thus considerable delay and increased expense by reason of the fuel thus wasted will be entailed, which it is one of the special objects of this invention to avoid.

The mass discharged from the second mixing-machine is conveyed and distributed by means of a reciprocating channel-frame to a series of hoppers superposed above the presses used for molding the mixture into bricks or other articles of the desired shape and size.

The accompanying drawing illustrates in diagrammatic longitudinal section an arrangement of a reciprocating channel-frame $a$ superposed above the molding-presses. The channel-frame $a$ is supported by lateral pivoted arms $b$ and is inclined in the direction in which the lime-and-sand mixture is distributed. The reciprocation is effected from a counter-shaft $c$ by means of a crank or crank-disk $d$, mounted thereupon, and a connecting-rod $e$.

The mixture of sand and lime may be delivered upon the reciprocating channel-frame $a$ by means of a conveyer $j$, which conveys the mixture from a lower floor, where the first mixing may take place.

In the movement of the reciprocating channel-frame $a$ the mixture is caused, by means of the reciprocation thereof, to pass along its entire length, and in so doing a certain quantity of the mixture falls through apertures $g'$ $h'$, suitably provided therein, into the hoppers $g$ $h$, placed above each of the molding-presses $i$. Each of the apertures $g'$ $h'$ mentioned is capable of being closed and each of the hoppers $g$ $h$, which feed the presses $i$, into which the mixture is delivered, is divided into two compartments $g$ and $h$, so as to provide for alternate working.

It is found to be an advantage, in order to insure thorough and complete hydration of the whole of the lime, to allow the mass to stand before molding it for a period of from ten to thirty-six hours after it has been prepared in the manner hereinbefore described, the exact time being determined by the condition and appearance of the mass. For this purpose each of the compartments in each of the series of hoppers is filled one day and allowed to remain over night for use in the presses on the following day, the other compartment of the hopper being used to receive the mass intended to be used on the next day following, the size of the hoppers and the respective compartments being adjusted accordingly. The mixture after standing, as above described, is then in its fresh condition fed into the presses, which may be of any usual construction, and is therein molded by mechanical pressure into bricks or other articles of the desired shape and size. The molded bricks or other articles are then piled or stacked upon trucks or carriages of convenient size and suitable construction and without any preliminary drying process, such as is used in other processes, and the loaded trucks are conveyed to and placed in steaming-chambers of suitable size and construction, where they are subjected to the action of steam of a pressure, preferably, of from six to eight atmospheres for a period of from three to ten hours, according to circumstances. By the action of the steam calcium silicates are formed in the body of the molded mass, and as a consequence induration and hardening of the bricks or other articles result. The pressure of the steam or the duration of treatment may be varied or increased for the purpose of effecting more rapid or a greater degree of induration.

By the preparation and treatment of the mixture in the manner hereinbefore described bricks or other articles so prepared from it can be indurated at a higher pressure of steam without undergoing disintegration. There is also the further advantage that the molds required to be used in other processes for holding the mixtures of sand and lime during induration, so as to avoid cracking or disintegration, are in this process quite unnecessary, and thus the use and maintenance of such molds, which are both costly and cumbersome and expensive to maintain and use, are altogether avoided.

To the mixture produced in the second mixing-machine may be added cement, slate-dust, or other substances of a like nature as body materials or substances intended to impart any particular color to the indicated articles.

Having now described my invention, I desire it to be understood that I am aware that artificial stone or bricks have been made by the process of treating a mixture of sand and lime with high-pressure steam. I therefore make no claim to the actual proportions of lime and sand hereinbefore specified or for such process, except when carried out under the particular conditions hereinbefore set forth; but

What I claim as new, and desire to secure by Letters Patent, is—

The herein-described process for the production of artificial stone or brick consisting in first mixing moist sand and unslaked lime so as to hydrate a portion of the lime only, second, adding sufficient water to hydrate the lime remaining unhydrated or unslaked, and allowing said mixture to stand sufficient to complete hydration, thirdly, bringing the mixture into a plastic cohesive condition by the addition of a minimum amount of water, molding said plastic mixture into blocks, and finally subjecting such blocks to the action of high-pressure steam, substantially as described.

In witness whereof I have hereunto set my hand in presence of two witnesses.

PETER KLEBER.

Witnesses:
HENRY HASPER,
WOLDEMAR HAUPT.